(12) United States Patent
Hsu et al.

(10) Patent No.: US 11,189,957 B1
(45) Date of Patent: Nov. 30, 2021

(54) ELECTRONIC DEVICE AND SEALING STRUCTURE THEREOF

(71) Applicant: Wistron Corp., New Taipei (TW)

(72) Inventors: Po-Yuan Hsu, New Taipei (TW);
Tsung-Hsien Chen, New Taipei (TW);
Chia-Cheng Su, New Taipei (TW);
Cheng-Chuan Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/061,225

(22) Filed: Oct. 1, 2020

(30) Foreign Application Priority Data

Jun. 30, 2020  (TW) .................................. 109122006

(51) Int. Cl.
*H01R 13/52* (2006.01)

(52) U.S. Cl.
CPC ..... *H01R 13/5202* (2013.01); *H01R 13/5213* (2013.01); *H01R 13/5216* (2013.01)

(58) Field of Classification Search
CPC ............ H01R 13/4538; H01R 13/5202; H01R 13/5213; H01R 13/5216; H05K 5/061
See application file for complete search history.

(56) References Cited

U.S. PATENT DOCUMENTS

| | | | | |
|---|---|---|---|---|
| 3,742,427 A | * | 6/1973 | Ballard | H01R 13/523 439/188 |
| 4,417,736 A | * | 11/1983 | Herrmann, Jr. | H01R 13/53 277/606 |
| 9,509,083 B2 | | 11/2016 | Yang | |
| 2014/0273567 A1 | * | 9/2014 | Huang | H01R 13/4538 439/157 |
| 2018/0077809 A1 | | 3/2018 | Uchiyama et al. | |
| 2018/0198228 A1 | * | 7/2018 | Eun | H01R 13/5202 |
| 2020/0212620 A1 | * | 7/2020 | Takahashi | H01R 13/5205 |

FOREIGN PATENT DOCUMENTS

| | | |
|---|---|---|
| CN | 103891073 A | 6/2014 |
| CN | 207133780 U | 3/2018 |
| CN | 207638647 U | 7/2018 |
| CN | 208673943 U | 3/2019 |
| CN | 110060895 A | 7/2019 |
| TW | M397041 U1 | 1/2011 |
| TW | 201424510 A | 6/2014 |

* cited by examiner

*Primary Examiner* — Tho D Ta

(57) ABSTRACT

A sealing structure is provided. The sealing structure is adapted to be disposed in an opening. The sealing structure includes a moveable block, a deformable bracket and an elastic member. When the moveable block is moved in a first direction, the deformable bracket pushes the elastic member, and the elastic member is deformed in a second direction and abuts the opening to seal the opening. The sealing structure is disposed in the opening to create a seal.

17 Claims, 11 Drawing Sheets

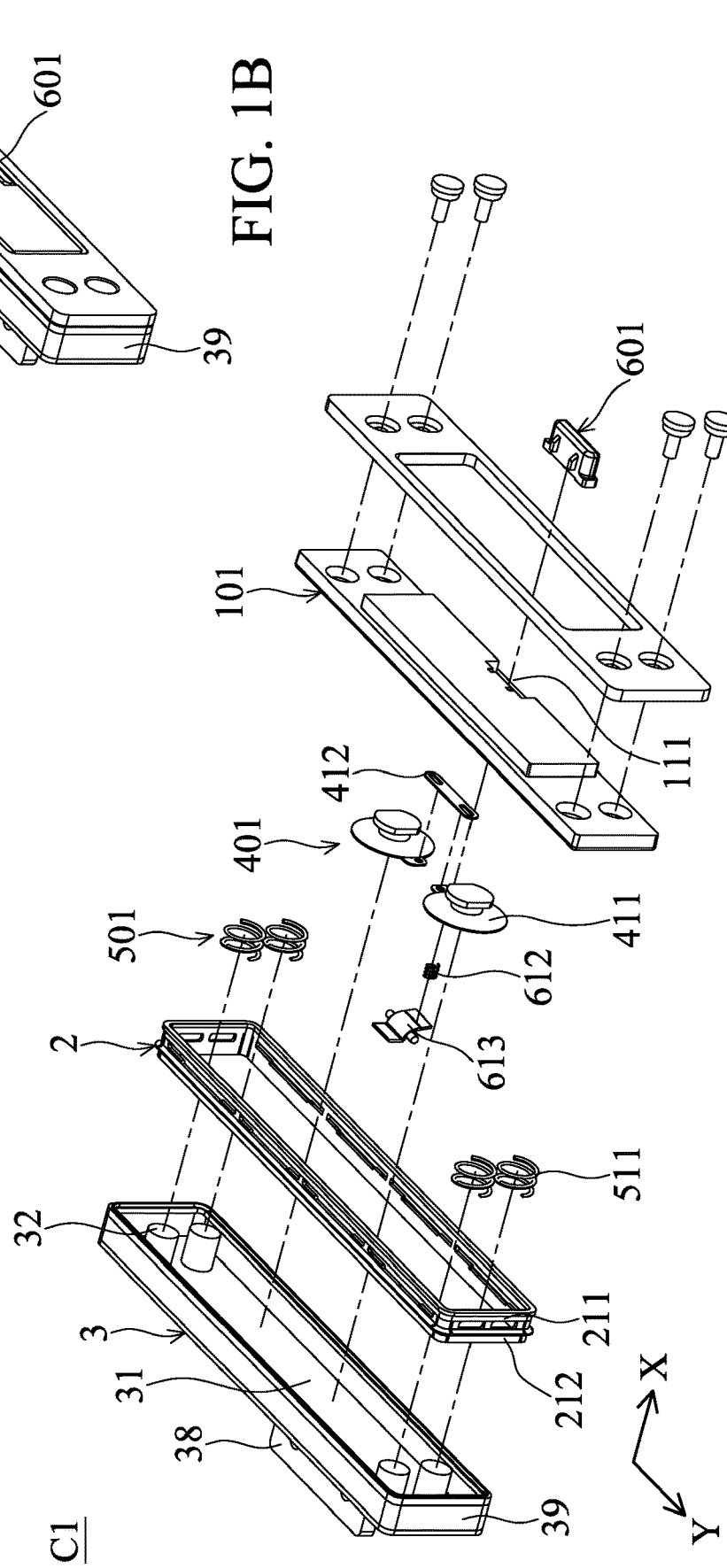

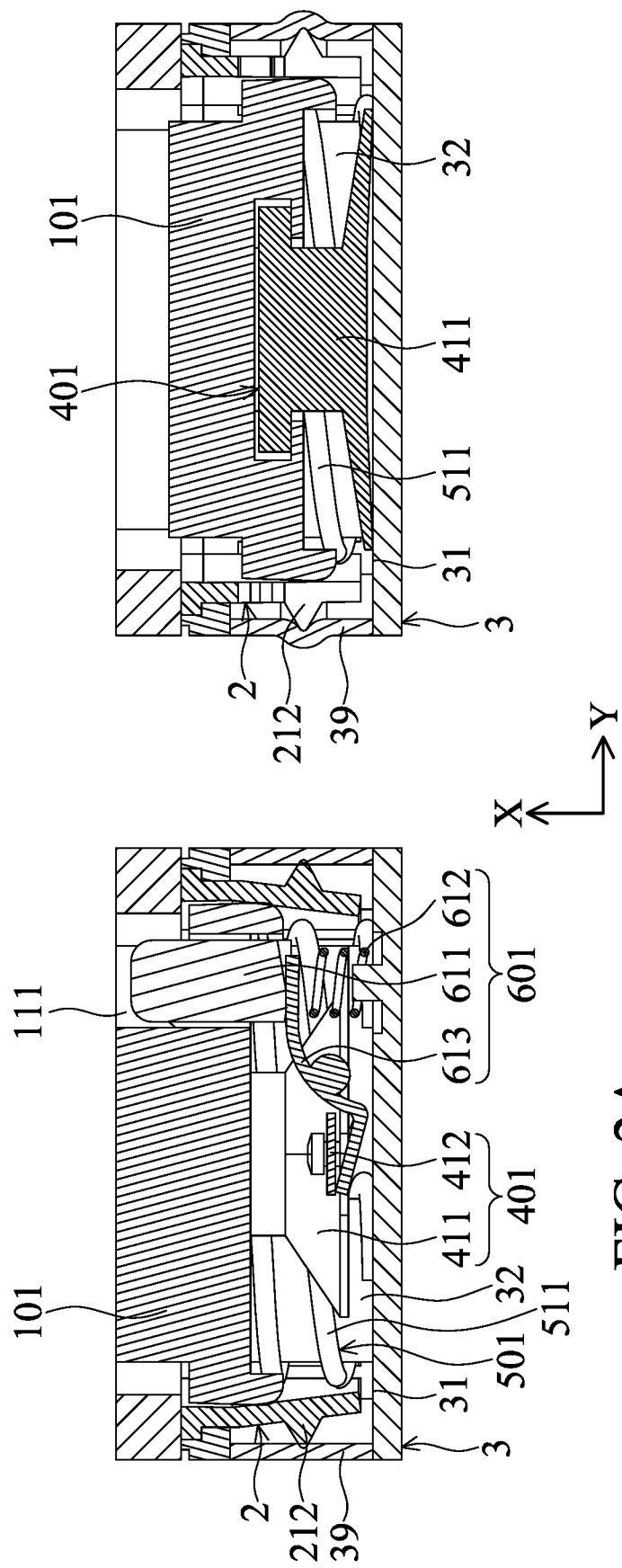

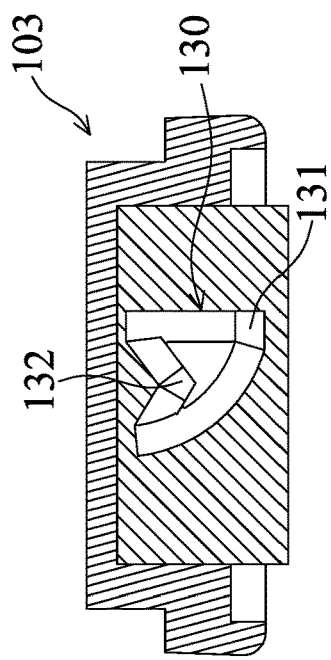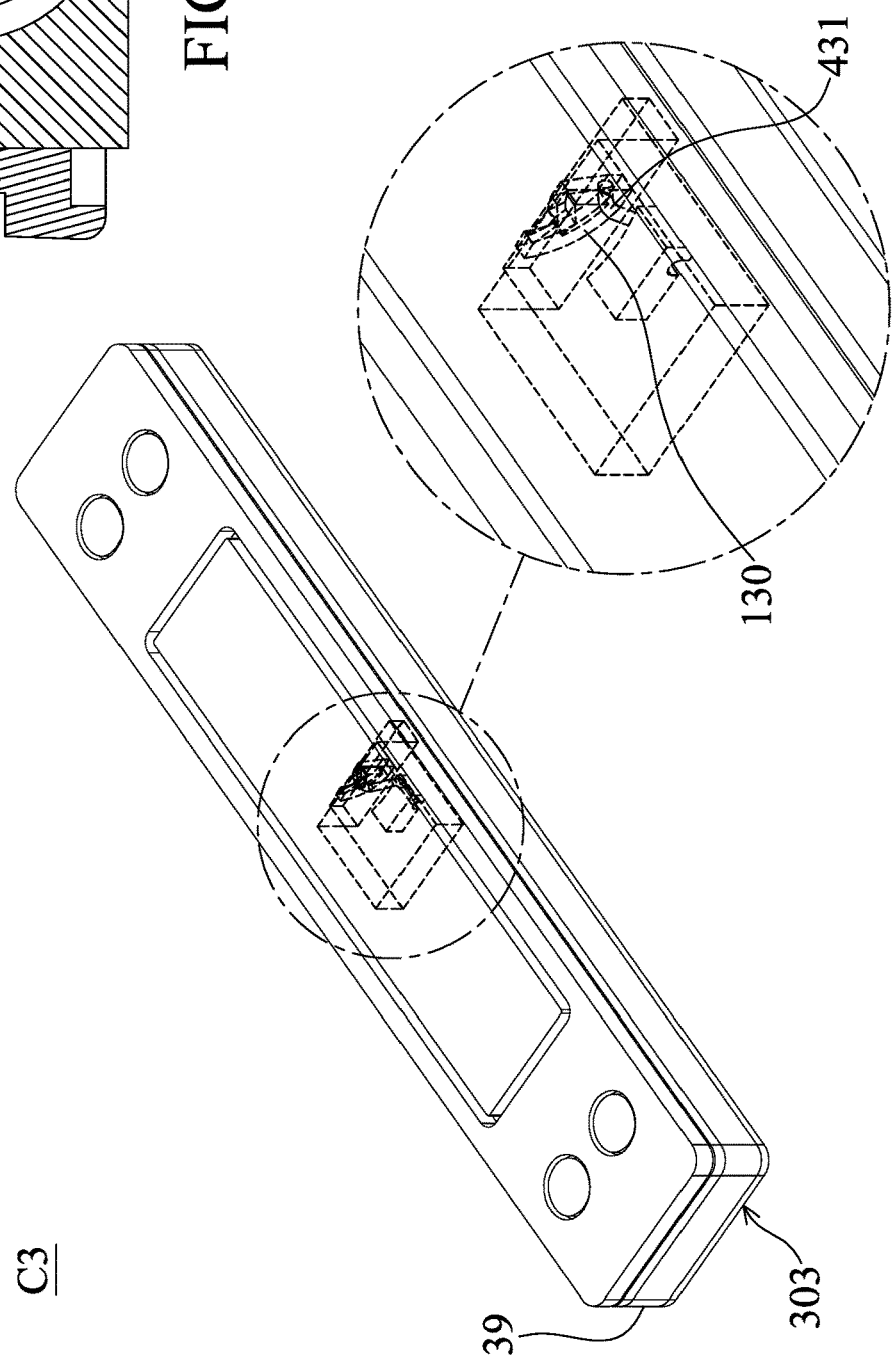

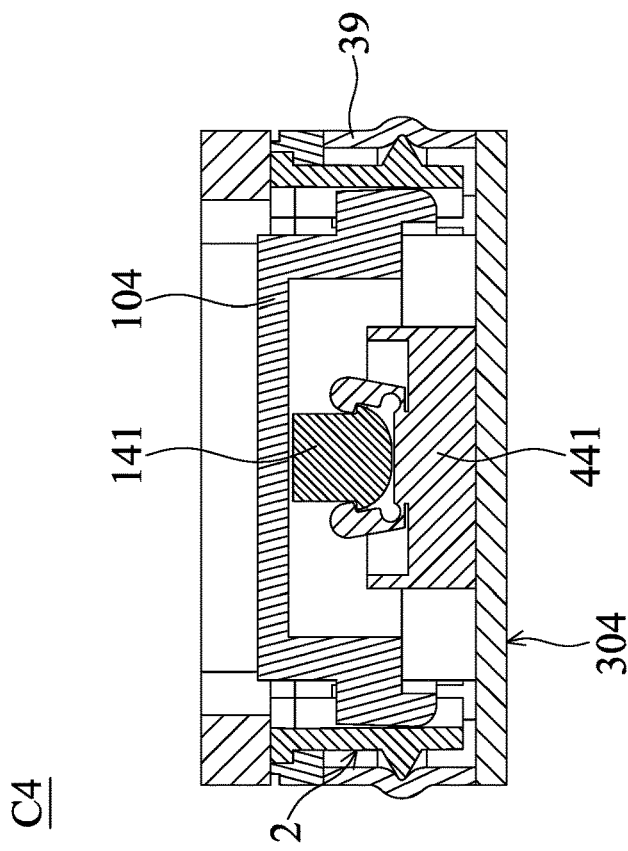
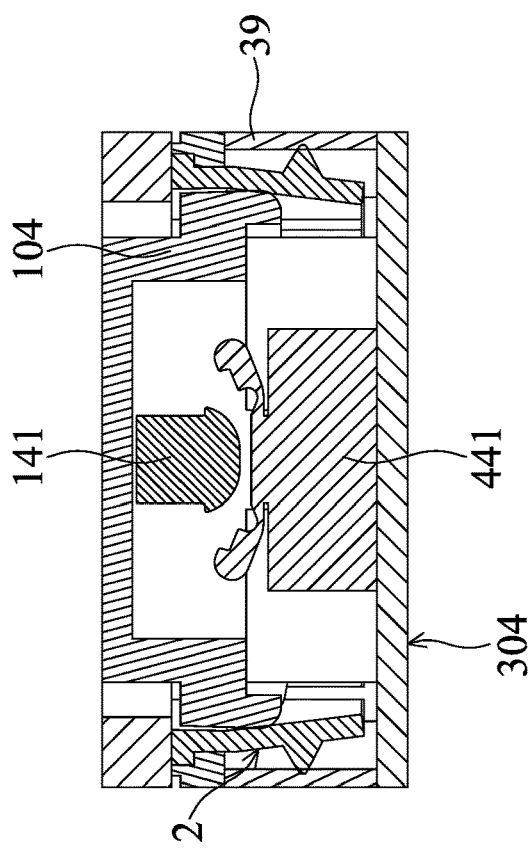
FIG. 7A
FIG. 7B

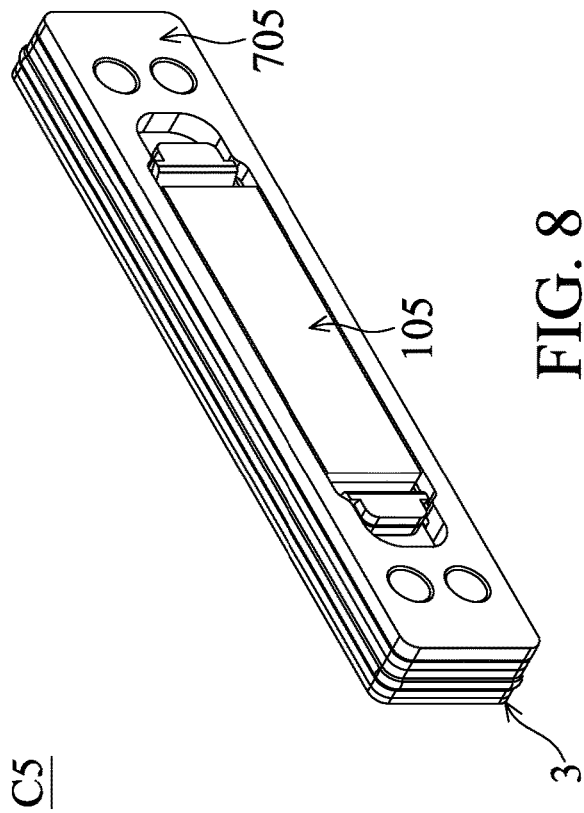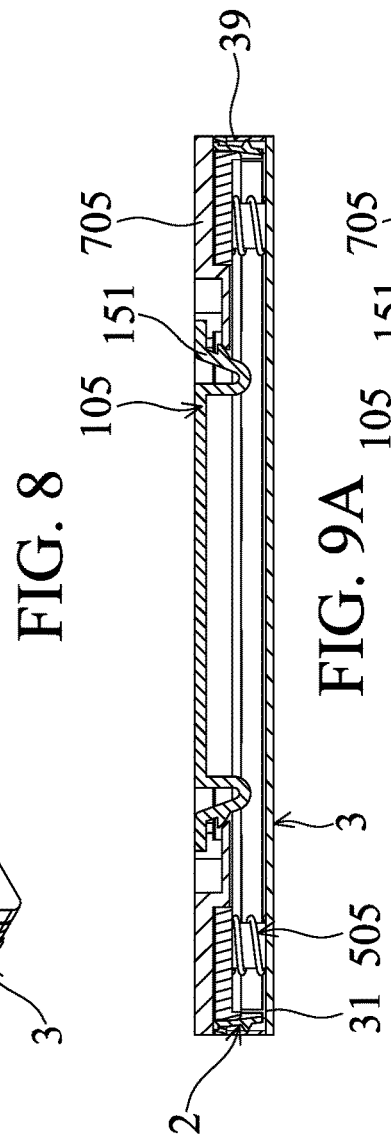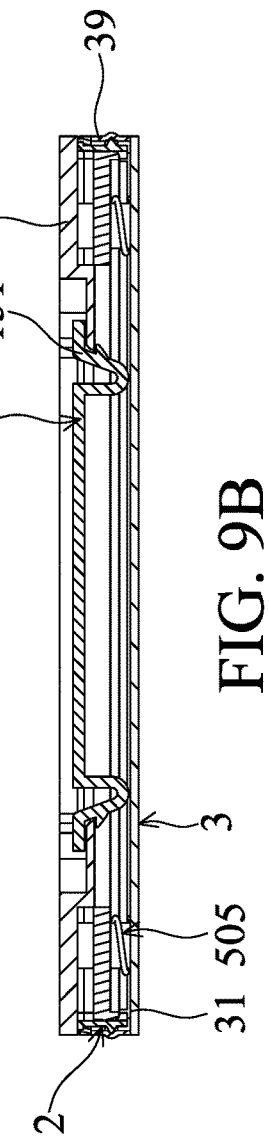

ELECTRONIC DEVICE AND SEALING STRUCTURE THEREOF

CROSS REFERENCE TO RELATED APPLICATIONS

This application claims priority of Taiwan Patent Application No. 109122006, filed on Jun. 30, 2020, the entirety of which is incorporated by reference herein.

BACKGROUND OF THE INVENTION

Field of the Invention

The present disclosure relates to a sealing structure, and in particular to a sealing structure that is waterproof and dust-proof.

Description of the Related Art

Conventionally, the connector of the electronic device, such as universal serial bus (USB) connector, is exposed outside the housing of the device. The connector can often become polluted with dust or water, and therefore damaged. A waterproof/dust-proof structure is required to protect the connector. A conventional waterproof/dust-proof structure is disposed on the housing, and is made of rubber or soft foam to provide waterproofing. However, conventional waterproof/dust-proof structures have a short lifespan and insufficient waterproof properties.

BRIEF SUMMARY OF THE INVENTION

Embodiments of the invention are provided to address the aforementioned difficulty.

In one embodiment, a sealing structure is provided. The sealing structure is adapted to be disposed in an opening. The sealing structure includes a moveable block, a deformable bracket and an elastic member. When the moveable block is moved in a first direction, the deformable bracket pushes the elastic member, and the elastic member is deformed in a second direction and abuts the opening to seal the opening.

In one embodiment, the moveable block is adapted to be moved between a first block position and a second block position in the first direction, when the moveable block is in the first block position, the deformable bracket is in a first bracket state, when the moveable block is in the second block position, the moveable block pushes the deformable bracket, and the deformable bracket is deformed to a second bracket state. The elastic member surrounds the deformable bracket. When the deformable bracket is in the first bracket state, the elastic member is in a first elastic member state, and when the deformable bracket is in the second bracket state, the deformable bracket pushes the elastic member to deform the elastic member in the second direction, and the elastic member is in a second elastic member state, wherein in the second elastic member state, the elastic member abuts an inner wall of the opening to seal the opening.

In one embodiment, an electronic device is provided. The electronic device includes a device body, a connector and a sealing structure. The device body comprises a device opening. The connector is located in the device opening. The sealing structure is adapted to be disposed in the device opening to create a seal. The sealing structure includes a moveable block, a deformable bracket and an elastic member. When the moveable block is moved in a first direction, the deformable bracket pushes the elastic member, and the elastic member is deformed in a second direction and abuts the device opening.

In one embodiment, the moveable block is adapted to be moved between a first block position and a second block position in the first direction, and when the moveable block is in the first block position, the deformable bracket is in a first bracket state, and when the moveable block is in the second block position, the moveable block pushes the deformable bracket, and the deformable bracket is deformed to a second bracket state, and when the deformable bracket is in the first bracket state, the elastic member is in a first elastic member state, and when the deformable bracket is in the second bracket state, the deformable bracket pushes the elastic member to deform the elastic member in the second direction, and the elastic member is in a second elastic member state, wherein in the second elastic member state, the elastic member abuts an inner wall of the device opening to seal the device opening.

In one embodiment, the sealing structure further comprises a frame, the elastic member is disposed in a portion of the frame, the frame comprises a frame extending portion, and the frame extending portion is connected to the device body.

The sealing structure of the embodiment of the invention can be utilized to electronic devices of military industry specifications, such as notebook, tablet, portable electronic device, or outdoor electric control box. The sealing structure provides sealing, waterproof, dust-proof, and explosion proof functions for the inner elements of the electronic devices. The sealing structure can also be utilized to the ship hatches, doors and windows of the buildings to create a seal. Utilizing the sealing structure of the embodiment of the invention, the moveable block pushes the deformable bracket, the deformable bracket pushes the elastic member, and the elastic member seals the opening. Therefore, the sealing structure will not be separated from the opening automatically, and the sealing structure provides reliable sealing function.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 1A is an exploded view of a sealing structure of a first embodiment of the invention;

FIG. 1B is an assembled view of the sealing structure of the first embodiment of the invention;

FIG. 2A is a cross sectional view of the sealing structure of the first embodiment of the invention, wherein a moveable block is in a first block position;

FIG. 2B is another cross sectional view of the sealing structure of the first embodiment of the invention, wherein the moveable block is in a second block position;

FIG. 5A shows a sealing structure of a third embodiment of the invention;

FIG. 5B shows the details of the sealing structure of the third embodiment of the invention;

FIG. 7A is a cross sectional view of a sealing structure of a fourth embodiment of the invention, wherein a moveable block is in a first block position;

FIG. 7B is another cross sectional view of the sealing structure of the fourth embodiment of the invention, wherein the moveable block is in a second block position;

FIG. 8 is a perspective view of a sealing structure of a fifth embodiment of the invention;

FIG. 9A is a cross sectional view of the sealing structure of the fifth embodiment of the invention, wherein a moveable block is in a first block position;

FIG. 9B is another cross sectional view of the sealing structure of the fifth embodiment of the invention, wherein the moveable block is in a second block position;

DETAILED DESCRIPTION OF THE INVENTION

Figure 1C:
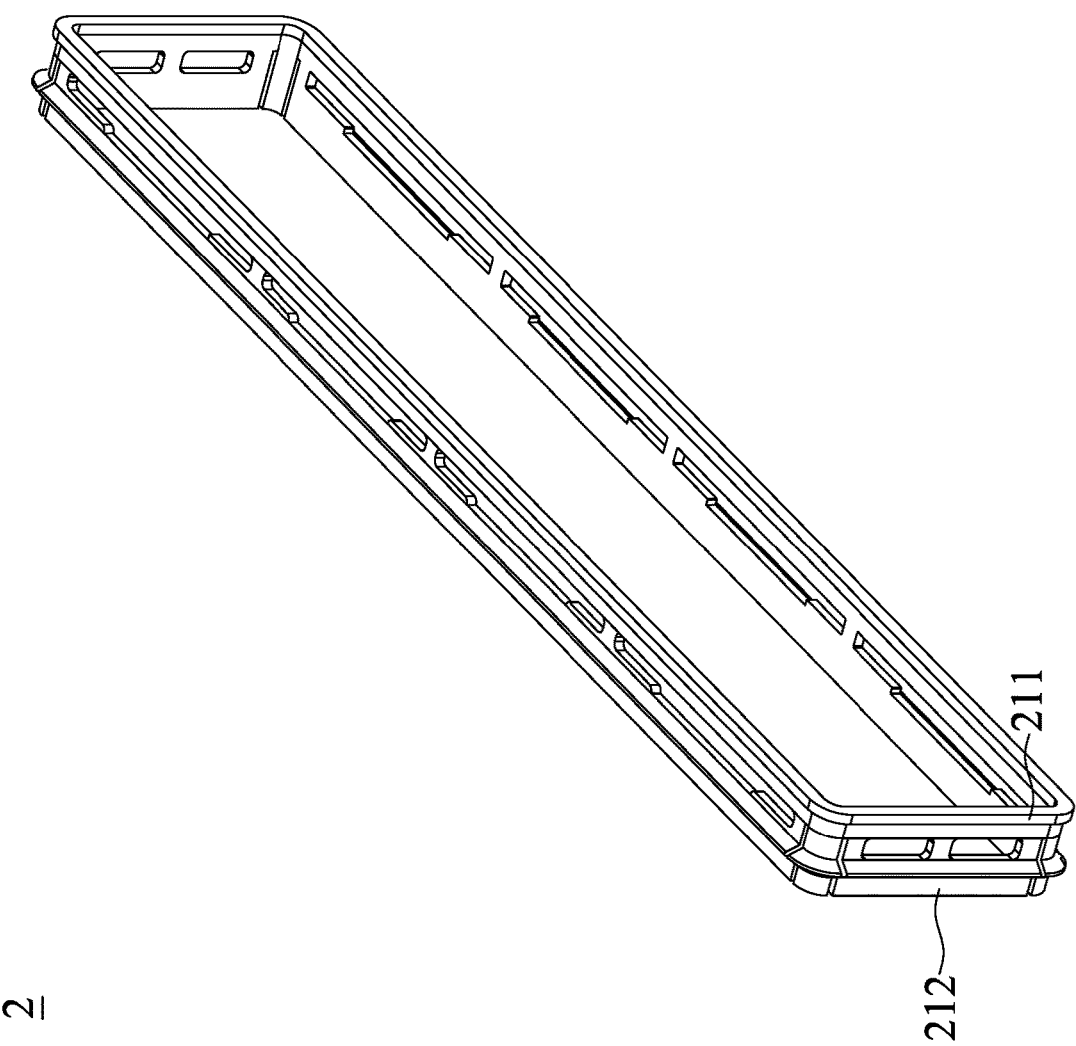
FIG. 1C shows the details of a deformable bracket of the embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

FIG. 1A is an exploded view of a sealing structure of a first embodiment of the invention. FIG. 1B is an assembled view of the sealing structure of the first embodiment of the invention. FIG. 2A is a cross sectional view of the sealing structure of the first embodiment of the invention, wherein a moveable block is in a first block position. FIG. 2B is another cross sectional view of the sealing structure of the first embodiment of the invention, wherein the moveable block is in a second block position. To simplify the drawings, FIGS. 2A and 2B show different parts of the sealing structure of the first embodiment of the invention. With reference to FIGS. 1A, 1B, 2A and 2B, the sealing structure C1 of the first embodiment of the invention is adapted to be disposed in an opening to seal the opening (to provide waterproofing and dust-proofing). The sealing structure C1 includes a moveable block 101, a deformable bracket 2 and an elastic member 39. When the moveable block 101 is moved in a first direction X, the deformable bracket 2 pushes the elastic member 39, and the elastic member 39 is deformed in a second direction Y and abuts the opening to seal the opening. In particular, in one embodiment, the moveable block 101 is adapted to be moved between a first block position (FIG. 2A) and a second block position (FIG. 2B) in the first direction X. When the moveable block 101 is in the first block position (FIG. 2A), the deformable bracket 2 is in a first bracket state. When the moveable block 101 is in the second block position (FIG. 2B), the moveable block 101 pushes the deformable bracket 2, and the deformable bracket 2 is deformed to a second bracket state. The elastic member 39 surrounds the deformable bracket 2. When the deformable bracket 2 is in the first bracket state (FIG. 2A), the elastic member 39 is in a first elastic member state. When the deformable bracket 2 is in the second bracket state (FIG. 2B), the deformable bracket 2 pushes the elastic member 39 to deform the elastic member 39 in the second direction Y, and the elastic member 39 is in a second elastic member state. In the second elastic member state, the elastic member 39 abuts an inner wall of the opening to seal the opening.

With reference to FIGS. 1A, 2A and 2B, in one embodiment, the deformable bracket 2 has a protrusion. When the deformable bracket 2 is in the second bracket state (FIG. 2B), the protrusion of the deformable bracket 2 pushes the elastic member 39 to deform the elastic member 39 in the second direction Y, and the elastic member 39 is in the second elastic member state. In one embodiment, the protrusion can surround the whole deformable bracket 2 or a portion of the deformable bracket 2. In one embodiment, the end of the protrusion can be circular, corn-shaped or I-shaped.

With reference to FIGS. 1A, 1B, 2A and 2B, in one embodiment, the sealing structure C1 further comprises a frame 3, a positioning unit 401 and a recovery unit 501. The frame 3 has an inner surface 31. The inner surface 31 faces the moveable block 101. The elastic member 39 is disposed on the frame 3. The positioning unit 401 is disposed on the moveable block 101. The recovery unit 501 is connected to the inner surface 31 and the moveable block 101. When the moveable block 101 is in the second block position (FIG. 2B), the positioning unit 401 connects the moveable block 101 to the frame 3 to keep the moveable block 101 in the second block position.

With reference to FIGS. 1A and 2A, when the connection between the positioning unit 401 and the frame 3 is released, the recovery unit 501 pushes the moveable block 101, and the moveable block 101 is therefore pushed from the second block position back to the first block position. When the moveable block 101 is in the first block position, the sealing structure can be removed from the opening.

With reference to FIGS. 1A, 1B, 2A and 2B, in one embodiment, the positioning unit 401 comprises a suction cup 411, and when the moveable block 101 is in the second block position (FIG. 2B), the suction cup 411 is attached to the inner surface 31 of the frame 3.

With reference to FIGS. 1A, 1B, 2A and 2B, in one embodiment, the sealing structure C1 further comprises a button unit 601. The positioning unit 401 further comprises a releasing sheet 412. The releasing sheet 412 is connected to the suction cup 411 (in one embodiment, the releasing sheet 412 is disposed between the two suction cups 411). When the connection between the positioning unit 401 and the frame 3 needs to be released, the button unit 601 moves the releasing sheet 412, the suction cup 411 is pulled and separated from the inner surface 31.

With reference to FIGS. 1A and 2A, in one embodiment, the button unit 601 comprises a button 611, a button spring 612 and a button linkage 613. The button linkage 613 is connected to the button 611 and the releasing sheet 412. One end of the button spring 612 is connected to the inner surface 31, and the other end of the button spring 612 is connected to the button 611. When the button 611 is pressed, the button linkage 613 moves the releasing sheet 412, and the suction cup 411 is pulled and separated from the inner surface 31.

With reference to FIG. 2A, in one embodiment, the moveable block 101 comprises a block through hole 111, and the button 611 passes through the block through hole 111.

With reference to FIGS. 1A, 2A and 2B, in one embodiment, the recovery unit 501 further comprises a recover spring 511. One end of the recover spring 511 abuts the inner surface 31 and the other end of the recover spring 511 abuts the moveable block 101.

With reference to FIGS. 1A, 2A and 2B, in one embodiment, the frame 3 comprises a positioning post 32. The positioning post 32 is disposed on the inner surface 31. At least a portion of the recover spring 511 is telescoped on the positioning post 32.

FIG. 1C shows the details of the deformable bracket of the embodiment of the invention. With reference to FIGS. 1C, 2A and 2B, in one embodiment, the deformable bracket 2 comprises a bracket body 211 and a plurality of bracket arms 212. The bracket arms 212 are connected to the bracket body 211. When the deformable bracket 2 is in the first bracket state, the bracket arms 212 are in a first arm orientation (FIG. 2A). When the deformable bracket 2 is in the second bracket state, the bracket arms 212 are in a second arm orientation and push the elastic member 39 in the second direction (FIG. 2B). In one embodiment, each bracket arm 212 is a cantilever beam. One end of the bracket arm 212 is connected to the bracket body 211, and the other end of the bracket arm 212 is a free end.

With reference to FIGS. 1A, 2A and 2B, when the sealing structure C1 is activated, the user moves the moveable block 101 in the first direction to move the moveable block 101 from the first block position to the second block position, the moveable block 101 pushes the deformable bracket 2, and the deformable bracket 2 then pushes the elastic member 39 to deform the elastic member 39 in the second direction. The elastic member 39 now can abut the opening to provide sealing, waterproofing, and dust-proofing. When the sealing structure C1 needs to be released, the user presses the button unit 601, and the connection between the positioning unit 401 and the frame 3 is released. The recovery unit 501 pushes the moveable block 101, and the moveable block 101 is moved from the second block position to the first block position. The elastic member 39 now can contact the opening to provide sealing and dust-proofing.

Figure 3B:
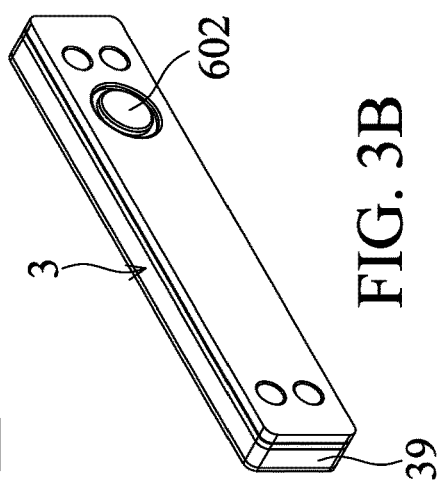
FIG. 3B is an assembled view of the sealing structure of the second embodiment of the invention.
Figure 3A:
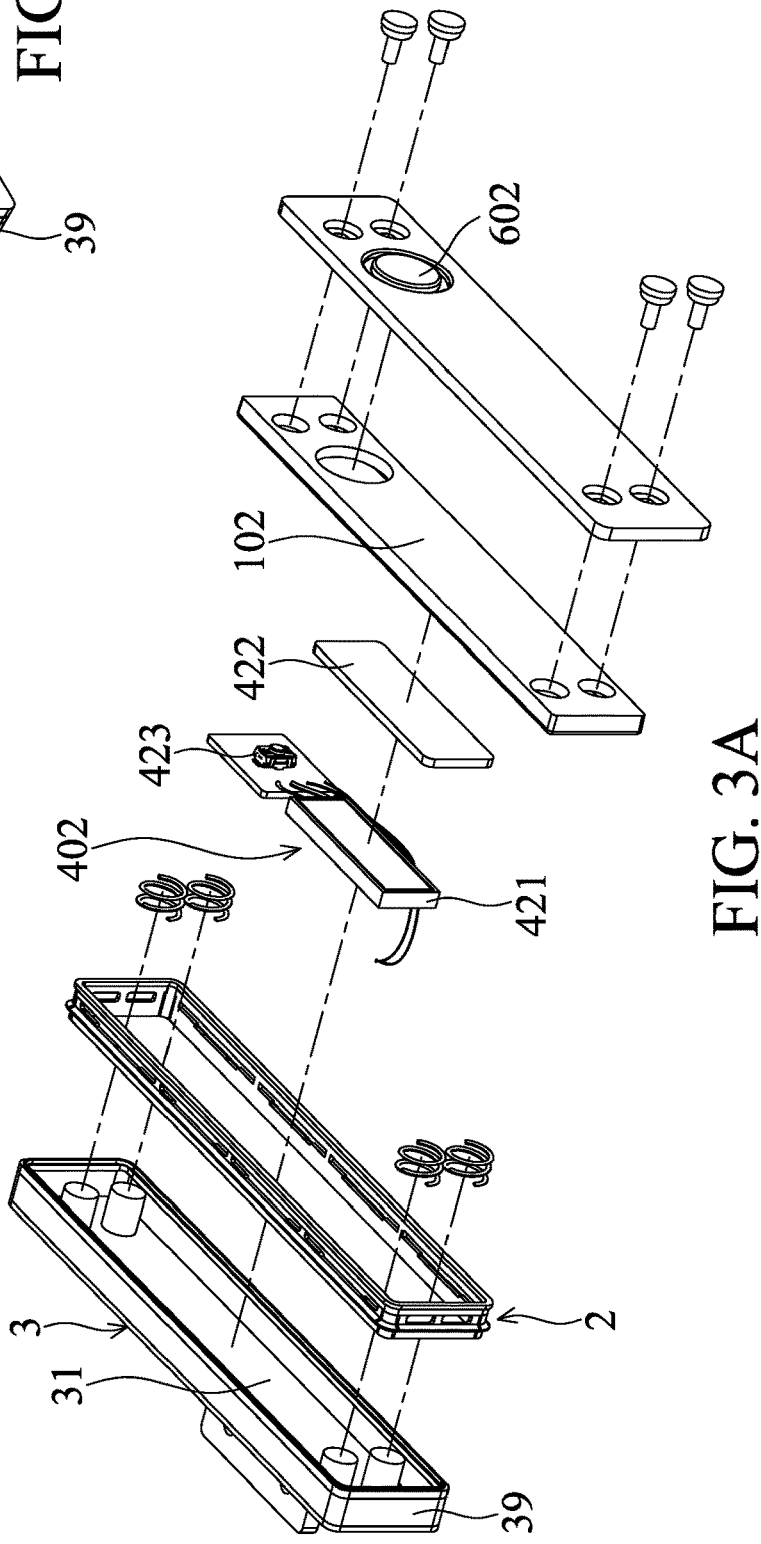
FIG. 3A is an exploded view of a sealing structure of a second embodiment of the invention.
Figure 4A:
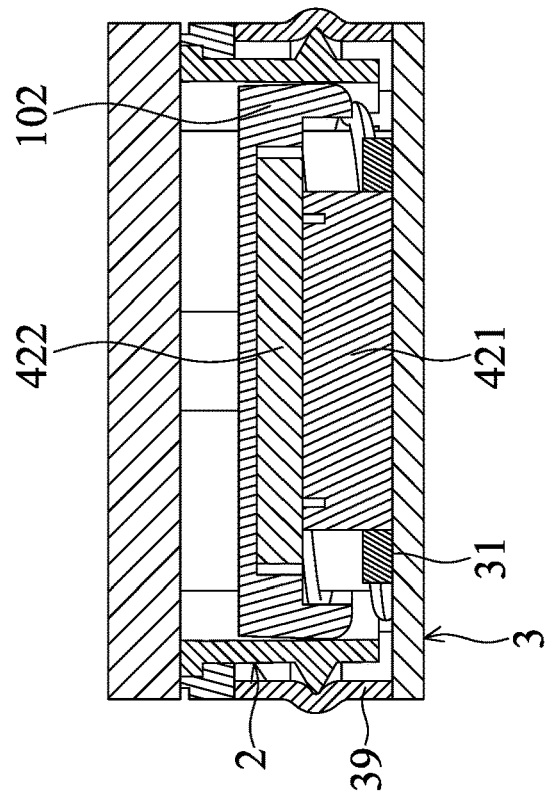
FIG. 4A is a cross sectional view of the sealing structure of the second embodiment of the invention, wherein a moveable block is in a first block position.
Figure 4B:
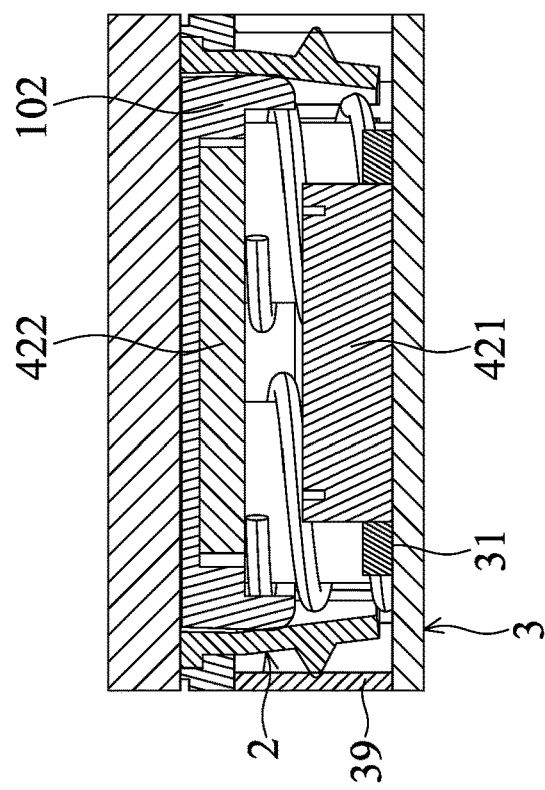
FIG. 4B is another cross sectional view of the sealing structure of the second embodiment of the invention, wherein the moveable block is in a second block position.

FIG. 3A is an exploded view of a sealing structure of a second embodiment of the invention. FIG. 3B is an assembled view of the sealing structure of the second embodiment of the invention. FIG. 4A is a cross sectional view of the sealing structure of the second embodiment of the invention, wherein a moveable block is in a first block position. FIG. 4B is another cross sectional view of the sealing structure of the second embodiment of the invention, wherein the moveable block is in a second block position. With reference to FIGS. 3A, 3B, 4A and 4B, the sealing structure C2 of the second embodiment of the invention is adapted to be disposed in an opening to seal the opening (to provide waterproofing and dust-proofing). The sealing structure C2 includes a moveable block 102, a deformable bracket 2 and an elastic member 39. When the moveable block 102 is moved in the first direction, the deformable bracket 2 pushes the elastic member 39, and the elastic member 39 is deformed in the second direction and abuts the opening to seal the opening. In particular, in one embodiment, the sealing structure C2 further comprises a positioning unit 402. The positioning unit 402 comprises an electromagnet 421 and a magnetizable(permeability) member 422. The electromagnet 421 is connected to the inner surface 31, and the magnetizable member 422 is connected to the moveable block 102. By the magnetic force between the electromagnet 421 and the magnetizable member 422, and by the elastic force of the recovery unit, the moveable block 102 is moved between the first block position and the second block position in the first direction. In one embodiment, the positioning unit 402 further comprises a switch 423. The sealing structure C1 further comprises a button unit 602. The button unit 602 presses the switch 423 to switch the magnetic force, and the moveable block is moved between the first block position and the second block position. In one embodiment, the magnetizable member 422 and the moveable block 102 can be integrally formed. In another embodiment, the moveable block 102 can be made of magnetizable material.

With reference to FIGS. 3A, 3B, 4A and 4B, when the sealing structure C2 is activated, the user presses the button unit 602 to activate the switch 423. By the magnetic force between the electromagnet 421 and the magnetizable member 422, the moveable block 102 is moved from the first block position to the second block position in the first direction, the moveable block 102 pushes the deformable bracket 2, and the deformable bracket 2 then pushes the elastic member 39 to deform the elastic member 39 in the second direction. The elastic member 39 now can abut the opening to provide sealing, waterproofing, and dust-proofing. When the sealing structure C2 needs to be released, the user presses the button unit 602 again to activate the switch 423, and the magnetic force between the electromagnet 421 and the magnetizable member 422 is disappeared. The recovery unit pushes the moveable block 102, and the moveable block 102 is moved from the second block position to the first block position. The elastic member 39 now can contact the opening to provide sealing and dust-proofing.

Figure 6A:
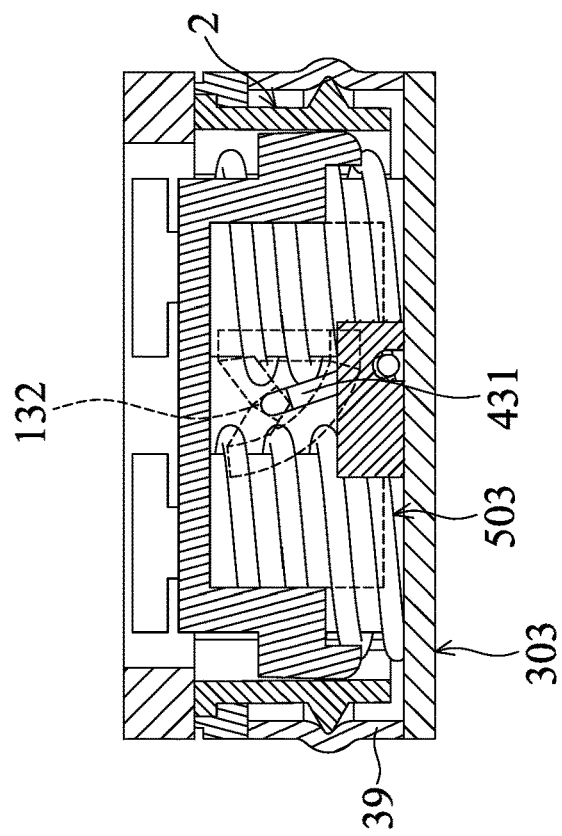
FIG. 6A is a cross sectional view of the sealing structure of the third embodiment of the invention, wherein a moveable block is in a first block position.
Figure 6B:
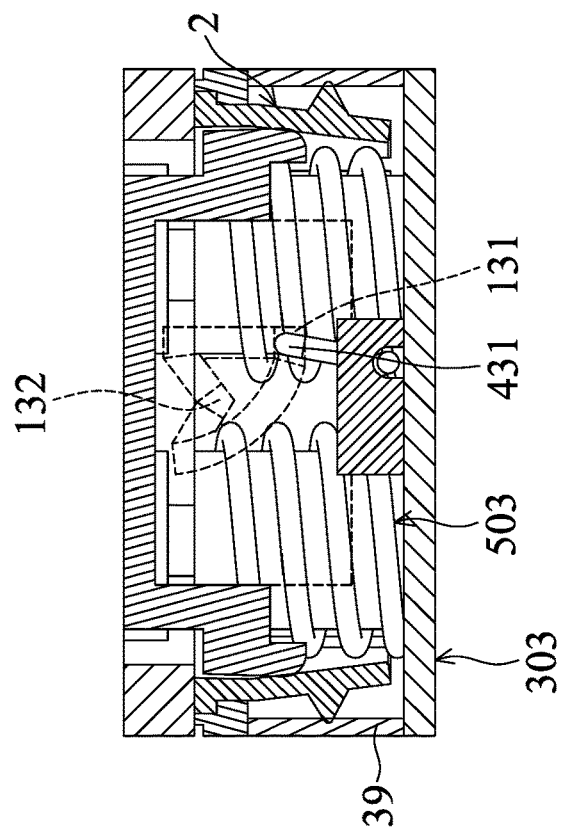
FIG. 6B is another cross sectional view of the sealing structure of the third embodiment of the invention, wherein the moveable block is in a second block position.

FIG. 5A shows a sealing structure of a third embodiment of the invention. FIG. 5B shows the details of the sealing structure of the third embodiment of the invention. FIG. 6A is a cross sectional view of the sealing structure of the third embodiment of the invention, wherein a moveable block is in a first block position. FIG. 6B is another cross sectional view of the sealing structure of the third embodiment of the invention, wherein the moveable block is in a second block position. With reference to FIGS. 5A, 5B, 6A and 6B, the sealing structure C3 of the third embodiment of the invention is adapted to be disposed in an opening to seal the opening (to provide waterproofing and dust-proofing). The sealing structure C3 includes a moveable block 103, a deformable bracket 2 and an elastic member 39. When the moveable block 103 is moved in the first direction, the deformable bracket 2 pushes the elastic member 39, and the elastic member 39 is deformed in the second direction and abuts the opening to seal the opening. In particular, in one embodiment, the sealing structure C3 further comprises a frame 303, a positioning unit and a recovery unit 503. The positioning unit comprises a latch 431 and a restriction track 130 formed on the moveable block 103. The elastic member 39 is disposed on the frame 303. The latch 431 pivots on the frame 303. The restriction track 130 is formed on the moveable block 103. One end of the latch 431 is connected to the restriction track 130. When the moveable block 103 is in the first block position (FIG. 6A), the latch 431 is in a first track position 131 on the restriction track 130. When the moveable block 103 is moved from the first block position to the second block position in the first direction, the latch 431 is slid from the first track position 131 to a second track position 132 on the restriction track 130 and stays in the second track position 132 (FIG. 6B) to keep the moveable block 103 in the second block position. The recovery unit 503 is connected to the frame 303 and the moveable block 103. In this embodiment, by sliding the latch 431 in the restriction track 130, the moveable block 103 can be moved between the first block position and the second block position.

With reference to FIGS. 5A, 5B, 6A and 6B, when the sealing structure C3 is activated, the user moves the moveable block 103 in the first direction to move the moveable block 103 from the first block position to the second block position, the moveable block 103 pushes the deformable bracket 2, and the deformable bracket 2 then pushes the elastic member 39 to deform the elastic member 39 in the second direction. The elastic member 39 now can abut the opening to provide sealing, waterproofing, and dust-proofing. When the sealing structure C3 needs to be released, the user moves the moveable block 103 again. The latch 431 is moved from the second track position 132 back to the first track position 131, the recovery unit 503 pushes the moveable block 103, and the moveable block 103 is moved from the second block position to the first block position. The elastic member 39 now can contact the opening to provide sealing and dust-proofing.

FIG. 7A is a cross sectional view of a sealing structure of a fourth embodiment of the invention, wherein a moveable block is in a first block position. FIG. 7B is another cross sectional view of the sealing structure of the fourth embodiment of the invention, wherein the moveable block is in a second block position. With reference to FIGS. 7A and 7B, the sealing structure C4 of the fourth embodiment of the invention is adapted to be disposed in an opening to seal the opening (to provide waterproofing and dust-proofing). The sealing structure C4 includes a moveable block 104, a deformable bracket 2 and an elastic member 39. When the moveable block 104 is moved in the first direction, the deformable bracket 2 pushes the elastic member 39, and the elastic member 39 is deformed in the second direction and abuts the opening to seal the opening. In particular, in one embodiment, the sealing structure C4 further comprises a frame 304 and a positioning unit. The positioning unit comprises a fastener 441 and a positioning hook 141. The elastic member 39 is disposed on the frame 304. The fastener 441 is disposed on the frame 304. The positioning hook 141 is connected to the moveable block 104. When the moveable block 104 is in the first block position (FIG. 7A), the positioning hook 141 is separated from the fastener 441, and when the moveable block 104 is in the second block position (FIG. 7B), the positioning hook 141 is connected to the fastener 441 to keep the moveable block 104 in the second block position. The fastener 441 can be connected to or separated from the positioning hook 141, and the moveable block 104 can be moved between the first block position and the second block position in the first direction. In one embodiment, the fastener 441 has compressed spring to provide elastic force to separate the positioning hook 141.

With reference to FIGS. 7A and 7B, when the sealing structure C4 is activated, the user moves the moveable block 104 in the first direction to move the moveable block 104 from the first block position to the second block position, the moveable block 104 pushes the deformable bracket 2, and the deformable bracket 2 then pushes the elastic member 39 to deform the elastic member 39 in the second direction. The elastic member 39 now can abut the opening to provide sealing, waterproofing, and dust-proofing. When the sealing structure C4 needs to be released, the user moves the moveable block 104 again. The fastener 441 is separated from the positioning hook 141. The spring of the fastener 441 pushes the moveable block 103 from the second block position to the first block position. The elastic member 39 now can contact the opening to provide sealing and dust-proofing.

FIG. 8 is a perspective view of a sealing structure of a fifth embodiment of the invention. FIG. 9A is a cross sectional view of the sealing structure of the fifth embodiment of the invention, wherein a moveable block is in a first block position. FIG. 9B is another cross sectional view of the sealing structure of the fifth embodiment of the invention, wherein the moveable block is in a second block position. With reference to FIGS. 8, 9A and 9B, the sealing structure C5 of the fifth embodiment of the invention is adapted to be disposed in an opening to seal the opening (to provide waterproofing and dust-proofing). The sealing structure C5 includes a moveable block 105, a deformable bracket 2 and an elastic member 39. When the moveable block 105 is moved in the first direction, the deformable bracket 2 pushes the elastic member 39, and the elastic member 39 is deformed in the second direction and abuts the opening to seal the opening. In particular, in one embodiment, the sealing structure C4 further comprises a frame 3 and a cover 705. The elastic member 39 is disposed on the frame 3. The cover 705 is connected to the frame 3. The moveable block 105 is adapted to connect the cover 705.

With reference to FIGS. 8, 9A and 9B, in one embodiment, the sealing structure C5 further comprises a positioning unit. The positioning unit comprises a wedging arm 151, and the wedging arm 151 is connected to the moveable block 105. When the moveable block 105 is in a first block position (FIG. 9A), the recess of the wedging arm 151 is separated from the cover 705. When the moveable block 105 is in the second block position (FIG. 9B), the recess of the wedging arm 151 is wedged into the cover 705 to keep the moveable block 105 in the second block position. The sealing structure C5 further comprises a recovery unit 505. The frame 3 comprises an inner surface 31. The inner surface 31 faces the moveable block 105. The recovery unit 505 is connected to the inner surface 31 and the moveable block 105. In this embodiment, by moving the wedging arm 151, the recovery unit 505 pushes the moveable block 105 when the notch of the wedging arm 151 is separated from the cover 705, and the moveable block 105 is therefore moved from the second block position to the first block position. In this embodiment, the notch of the wedging arm 151 is wedged into, or separated from, the cover 705, and the moveable block 105 is moved between the first block position and the second block position in the first direction.

With reference to FIGS. 8, 9A and 9B, when the sealing structure C5 is activated, the user moves the moveable block 105 in the first direction to move the moveable block 105 from the first block position to the second block position, the moveable block 105 pushes the deformable bracket 2, and the deformable bracket 2 then pushes the elastic member 39 to deform the elastic member 39 in the second direction. The elastic member 39 now can abut the opening to provide sealing, waterproofing, and dust-proofing. When the sealing structure C5 needs to be released, the user moves wedging arm 151, the recess of the wedging arm 151 is separated from the cover 705, the recovery unit 505 pushes the moveable block 105, and the moveable block 105 is moved from the second block position to the first block position. The elastic member 39 now can contact the opening to provide sealing and dust-proofing.

Figure 11A:
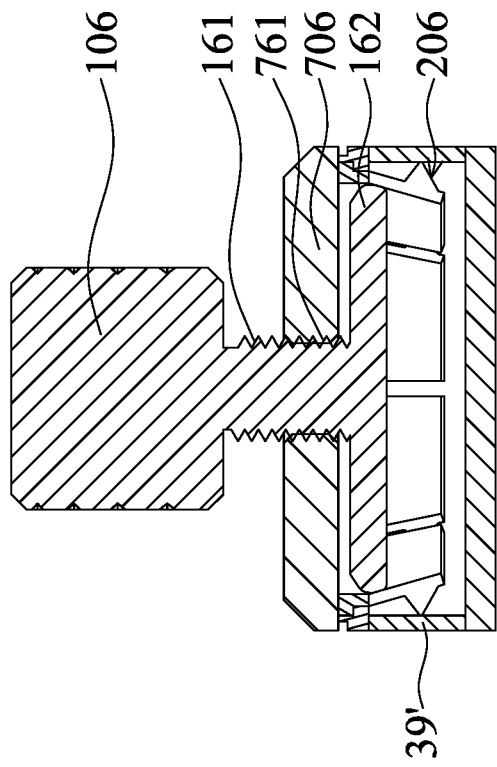
FIG. 11A is a cross sectional view of the sealing structure of the sixth embodiment of the invention, wherein a moveable block is in a first block position.
Figure 11B:
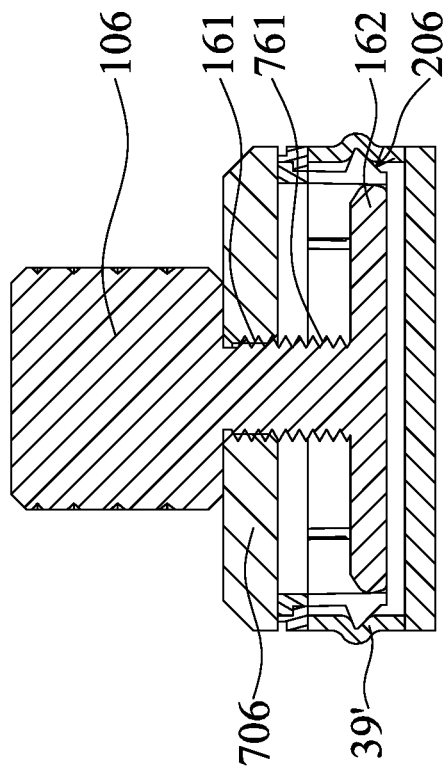
FIG. 11B is another cross sectional view of the sealing structure of the sixth embodiment of the invention, wherein the moveable block is in a second block position.
Figure 10:
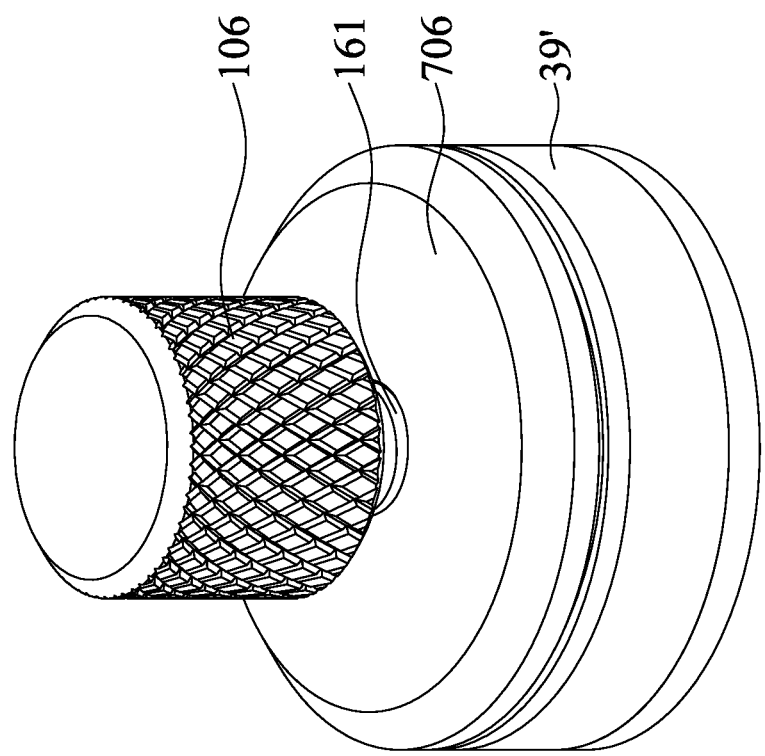
FIG. 10 is a perspective view of a sealing structure of a sixth embodiment of the invention.

FIG. 10 is a perspective view of a sealing structure of a sixth embodiment of the invention. FIG. 11A is a cross sectional view of the sealing structure of the sixth embodiment of the invention, wherein a moveable block is in a first block position. FIG. 11B is another cross sectional view of the sealing structure of the sixth embodiment of the invention, wherein the moveable block is in a second block position. With reference to FIGS. 10, 11A and 11B, the sealing structure C6 of the sixth embodiment of the invention is adapted to be disposed in an opening to seal the opening (to provide waterproofing and dust-proofing). The sealing structure C6 includes a moveable block 106, a deformable bracket 206 and an elastic member 39'. When the moveable block 106 is moved in the first direction, the deformable bracket 206 pushes the elastic member 39', and the elastic member 39' is deformed in the second direction and abuts the opening to seal the opening. In particular, in one embodiment, the sealing structure C6 further comprises a positioning unit and a cover 706. The positioning unit comprises a block thread portion 161 and a cover thread portion 761. The block thread portion 161 is formed on the moveable block 106. The cover thread portion 761 is formed on the cover 706. The block thread portion 161 is connected to the cover thread portion 761. The moveable block 106 comprises a dish portion 162. The dish portion 162 is adapted to push the deformable bracket 206 to deform the elastic member 39'. In one embodiment, the moveable block 106 is adapted to be moved between a first block position (FIG. 11A) and a second block position (FIG. 11B) in the first direction. When the moveable block 106 is in the first block position (FIG. 11A), the deformable bracket 206 is in a first bracket state. When the moveable block 106 is in the second block position (FIG. 11B), the dish portion 162 of the moveable block 106 pushes the deformable bracket 206, and the deformable bracket 206 is deformed to a second bracket state. The elastic member 39' surrounds the deformable bracket 206. When the deformable bracket 206 is in the first bracket state (FIG. 11A), the elastic member 39' is in a first elastic member state. When the deformable bracket 206 is in the second bracket state (FIG. 11B), the deformable bracket 206 pushes the elastic member 39' to deform the elastic member 39' in the second direction, and the elastic member 39' is in a second elastic member state. In the second elastic member state, the elastic member 39' abuts an inner wall of the opening to seal the opening.

With reference to FIGS. 10, 11A and 11B, when the sealing structure C6 is activated, the user rotates to move the moveable block 106 in the first direction and to move the moveable block 106 from the first block position to the second block position, the dish portion 162 of the moveable block 106 pushes the deformable bracket 206, and the deformable bracket 206 then pushes the elastic member 39' to deform the elastic member 39' in the second direction. The elastic member 39' now can abut the opening to provide sealing, waterproofing, and dust-proofing. When the sealing structure C6 needs to be released, the user moves the moveable block 106 again (rotates the moveable block 106 in opposite direction). The moveable block 105 is moved from the second block position to the first block position. The elastic member 39' now can contact the opening to provide sealing and dust-proofing.

Figure 12:
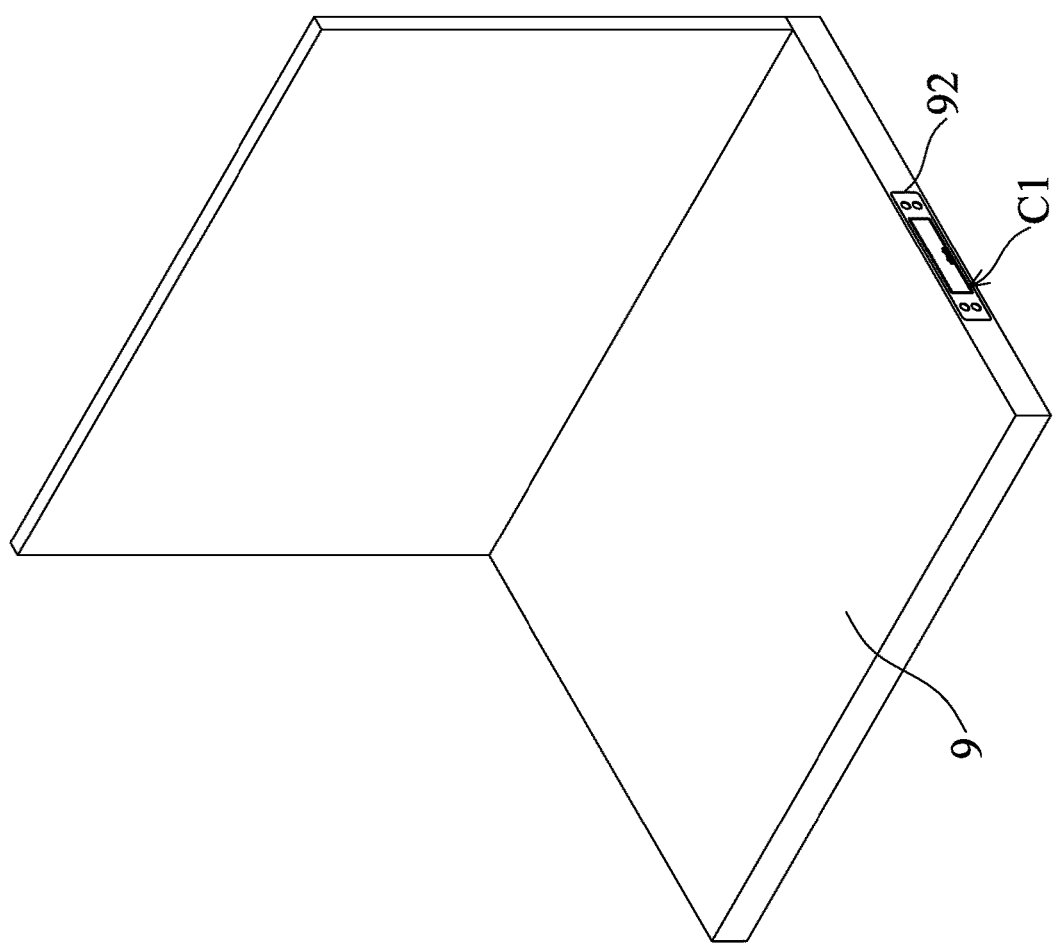
FIG. 12 shows an electronic device of the embodiment of the invention.

FIG. 12 shows an electronic device of the embodiment of the invention. With reference to FIG. 12, in another embodiment, an electronic device E is provided. The electronic device E includes a device body 9, a connector (such as USB port, HDMI port) and the mentioned sealing structure (for example, the sealing structure C1 of the first embodiment). The device body 9 comprises a device opening 92. The connector (not shown) is located in the device opening 92. The sealing structure C1 is adapted to be disposed in the device opening 92 to create a seal (making it waterproof and dust-proof). In particular, the sealing structure C1 is adapted to abut an inner wall of the device opening 92 to create a seal.

With reference to FIGS. 1A, 1B and 12, in one embodiment, the frame 3 of the sealing structure C1 comprises a frame extending portion 38. The frame extending portion 38 is connected to the device body 9. Therefore, when the sealing structure C1 is out of the opening 92, the sealing structure C1 can still connected to the device body 9 via the frame extending portion 38.

With reference to FIGS. 1A, 1B and 12, the sealing structure C1 can be disposed in the device opening 92. When the sealing structure C1 is not activated, the sealing structure C1 can provide basic sealing, dust-proof functions. When the sealing structure C1 is activated, the user moves the moveable block 101 in the first direction to move the moveable block 101 from the first block position to the second block position, and the deformable bracket 2 pushes the elastic member 39 to deform the elastic member 39 in the second direction. The elastic member 39 can abut the opening to provide sealing, waterproof, dust-proof, and explosion proof functions. When the sealing structure C1 needs to be released, the user presses the button unit 601, and the connection between the positioning unit 401 and the frame 3 is released. The recovery unit 501 pushes the moveable block 101, and the moveable block 101 is moved from the second block position to the first block position. The sealing structure C1 can be removed from the opening.

The sealing structure of the embodiment of the invention can be utilized to electronic devices of military industry specifications, such as notebook, tablet, portable electronic device, or outdoor electric control box. The sealing structure provides sealing, waterproof, dust-proof, and explosion proof functions for the inner elements of the electronic devices. The sealing structure can also be utilized to the ship hatches, doors and windows of the buildings to create a seal. Utilizing the sealing structure of the embodiment of the invention, the moveable block pushes the deformable bracket, the deformable bracket pushes the elastic member, and the elastic member seals the opening. Therefore, the sealing structure will not be separated from the opening automatically, and the sealing structure provides reliable sealing function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sealing structure, adapted to be disposed in an opening, comprising:
   a moveable block;
   a deformable bracket;
   an elastic member, wherein when the moveable block is moved in a first direction, the deformable bracket pushes the elastic member, and the elastic member is deformed in a second direction and abuts an interior sidewall of the opening to seal the opening, wherein the moveable block is adapted to be moved between a first block position and a second block position in the first direction;
   a frame; and
   a positioning unit, wherein the elastic member is disposed on the frame, at least a portion of the positioning unit is disposed between the moveable block and the frame, and when the moveable block is in the second block position, the positioning unit keeps the moveable block in the second block position.

2. The sealing structure as claimed in claim 1, wherein the deformable bracket comprises a bracket body and a bracket arm, the bracket arm is connected to the bracket body, the deformable bracket is deformed between a first bracket state and a second bracket state, and when the deformable bracket is in the first bracket state, the bracket arm is in a first arm orientation, and when the deformable bracket is in the second bracket state, the bracket arm is in a second arm orientation and pushes the elastic member.

3. The sealing structure as claimed in claim 1, wherein when the moveable block is in the first block position, the deformable bracket is in a first bracket state, and when the moveable block is in the second block position, the moveable block pushes the deformable bracket, and the deformable bracket is deformed to a second bracket state, wherein the elastic member surrounds the deformable bracket, and when the deformable bracket is in the first bracket state, the elastic member is in a first elastic member state, and when the deformable bracket is in the second bracket state, the deformable bracket pushes the elastic member to deform the elastic member in the second direction, and the elastic member is in a second elastic member state, wherein in the second elastic member state, the elastic member abuts the interior sidewall of the opening to seal the opening.

4. The sealing structure as claimed in claim 3, wherein the positioning unit comprises an electromagnet and a magnetizable member, the electromagnet is connected to the frame, and the magnetizable member is connected to the moveable block.

5. The sealing structure as claimed in claim 3, wherein the positioning unit comprises a latch and a restriction track, the latch pivots on the frame, the restriction track is formed on the moveable block, one end of the latch is connected to the restriction track, and when the moveable block is in the first block position, the latch is in a first track position on the restriction track, and when the moveable block is moved from the first block position to the second block position, the latch is slid from the first track position to a second track position and stays in the second track position to keep the moveable block in the second block position.

6. The sealing structure as claimed in claim 3, wherein the positioning unit comprises a fastener and a positioning hook, the fastener is disposed on the frame, the positioning hook is connected to the moveable block, and when the moveable block is in the first block position, the positioning hook is separated from the fastener, and when the moveable block is in the second block position, the positioning hook is connected to the fastener.

7. The sealing structure as claimed in claim 3, further comprising a cover, wherein the positioning unit comprises a wedging arm, the wedging arm is connected to the moveable block, and when the moveable block is in the second block position, the wedging arm is wedged into the cover.

8. The sealing structure as claimed in claim 3, further comprising a cover, wherein the positioning unit comprises a block thread portion and a cover thread portion, the block thread portion is formed on the moveable block, the cover thread portion is formed on the cover, the block thread portion is connected to the cover thread portion, the moveable block comprises a dish portion, and the dish portion is adapted to push the deformable bracket.

9. The sealing structure as claimed in claim 3, further comprising a recovery unit, wherein the recovery unit is connected to the frame and the moveable block, and when the connection between the positioning unit and the frame is released, the recovery unit pushes the moveable block from the second block position back to the first block position.

10. The sealing structure as claimed in claim 3, wherein the frame has an inner surface, the inner surface faces the moveable block, at least a portion of the positioning unit is disposed between the moveable block and the inner surface, and when the moveable block is in the second block position, the positioning unit connects the moveable block to the inner surface to keep the moveable block in the second block position.

11. The sealing structure as claimed in claim 10, wherein the positioning unit comprises a suction cup, and when the moveable block is in the second block position, the suction cup is attached to the inner surface.

12. The sealing structure as claimed in claim 11, further comprising a button unit, wherein the positioning unit further comprises a releasing sheet, the releasing sheet is connected to the suction cup, and when the button unit moves the releasing sheet, the suction cup is pulled and separated from the inner surface, and the positioning unit is released from the frame.

13. The sealing structure as claimed in claim 12, wherein the button unit comprises a button, a button spring and a button linkage, the button linkage is connected to the button and the releasing sheet, one end of the button spring is connected to the inner surface, and the other end of the button spring is connected to the button, and when the button is pressed, the button linkage moves the releasing sheet, and the suction cup is pulled and separated from the inner surface.

14. An electronic device, comprising:
   a device body, comprising a device opening;
   a connector, located in the device opening; and
   a sealing structure, adapted to be disposed in the device opening to provide sealing function, comprising:
      a moveable block;
      a deformable bracket; and
      an elastic member, wherein when the moveable block is moved in a first direction, the deformable bracket pushes the elastic member, and the elastic member is deformed in a second direction and abuts an interior sidewall of the device opening, wherein the moveable block is adapted to be moved between a first block position and a second block position in the first direction;
      a frame; and a positioning unit, wherein the elastic member is disposed on the frame, at least a portion of the positioning unit is disposed between the moveable block and the frame, and when the moveable block is in the second block position, the positioning unit keeps the moveable block in the second block position.

15. The electronic device as claimed in claim 14, wherein when the moveable block is in the first block position, the deformable bracket is in a first bracket state, and when the moveable block is in the second block position, the moveable block pushes the deformable bracket, and the deformable bracket is deformed to a second bracket state, and when the deformable bracket is in the first bracket state, the elastic member is in a first elastic member state, and when the deformable bracket is in the second bracket state, the deformable bracket pushes the elastic member to deform the elastic member in the second direction, and the elastic member is in a second elastic member state, wherein in the second elastic member state, the elastic member abuts the interior sidewall of the device opening to seal the device opening.

16. The electronic device as claimed in claim 14, wherein the elastic member is disposed in a portion of the frame, the frame comprises a frame extending portion, and the frame extending portion is connected to the device body.

17. The electronic device as claimed in claim 14, wherein at least a portion of the elastic member surrounds the deformable bracket.

* * * * *